Oct. 31, 1972  W. H. B. WRIGHT III  3,701,692
METHOD OF FLAME CUTTING MUD RELIEF CONCAVITIES IN SPROCKETS
Filed Dec. 16, 1971  3 Sheets-Sheet 1
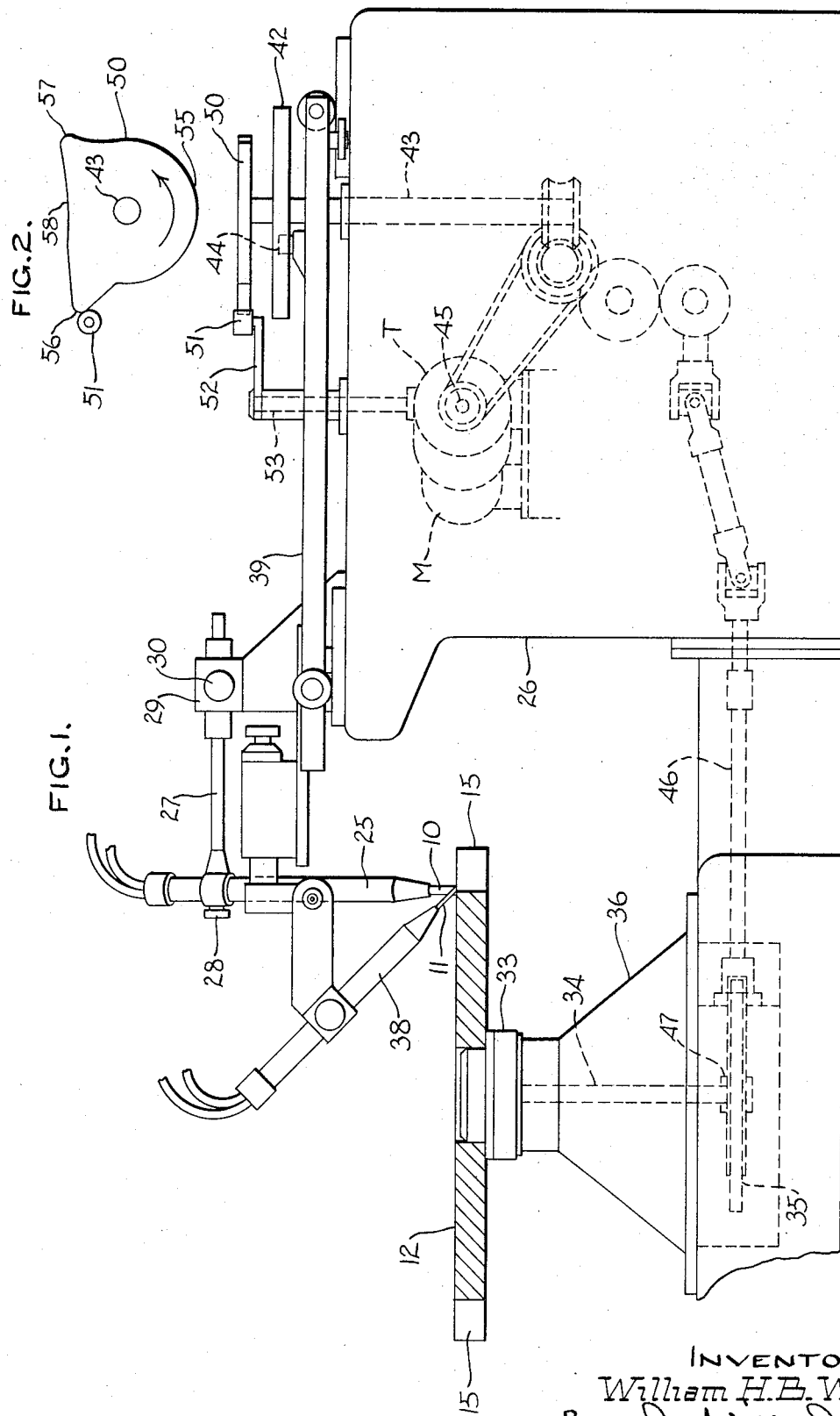
INVENTOR
William H.B. Wright III
By
ATTORNEY Oct. 31, 1972   W. H. B. WRIGHT III   3,701,692
METHOD OF FLAME CUTTING MUD RELIEF CONCAVITIES IN SPROCKETS
Filed Dec. 16, 1971   3 Sheets-Sheet 2
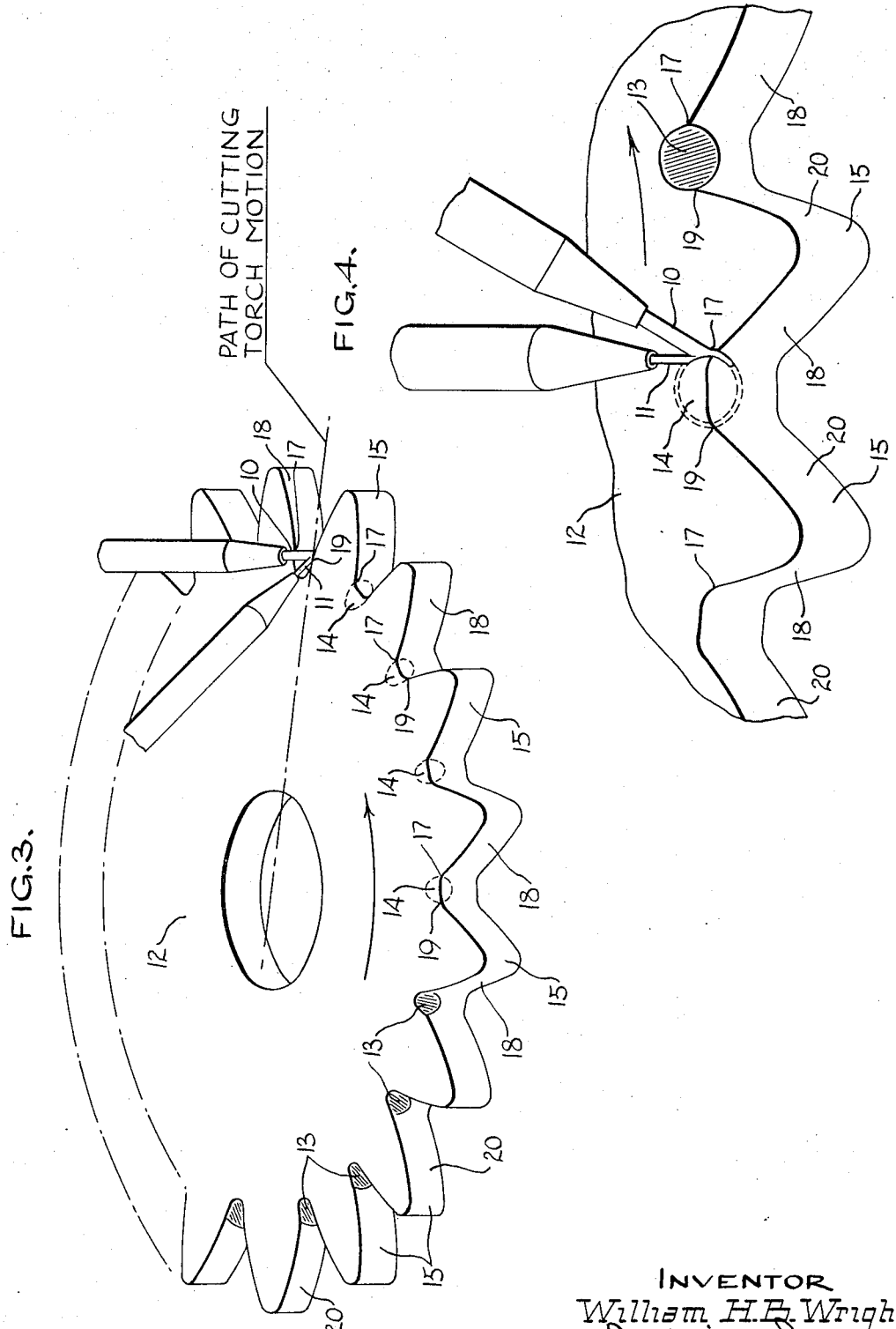
INVENTOR
William H. B. Wright III
BY Ira Milton Jones
ATTORNEY Oct. 31, 1972    W. H. B. WRIGHT III    3,701,692
METHOD OF FLAME CUTTING MUD RELIEF CONCAVITIES IN SPROCKETS
Filed Dec. 16, 1971    3 Sheets-Sheet 3

INVENTOR
William H. B. Wright III
By Ira Milton Jones
ATTORNEY

United States Patent Office /

3,701,692
Patented Oct. 31, 1972

3,701,692
METHOD OF FLAME CUTTING MUD RELIEF CONCAVITIES IN SPROCKETS
William H. B. Wright III, Whitefish Bay, Wis., assignor of a fractional part interest to Glenway Maxon, Jr., Milwaukee, Wis.
Continuation-in-part of abandoned application Ser. No. 51,640, July 1, 1970. This application Dec. 16, 1971, Ser. No. 208,573
Int. Cl. B23k 7/00
U.S. Cl. 148—9                                9 Claims

ABSTRACT OF THE DISCLOSURE

While a sprocket is rotated on its axis, heating and cutting flames are directed toward one side thereof. The heating flame preheats zones of the sprocket between adjacent teeth thereof. The cutting flame is oriented to diverge sharply outwardly away from the sprocket axis, and it is moved radially in and out, toward and from inner limits at which the cutting flame impinges and traverses said zones to thereby cut out mud relief concavities at said zones. In a modification of the method, the mud relief concavities are flame cut without use of a heating torch.

---

This application is a continuation-in-part of the copending application of William H. B. Wright III, Ser. No. 51,640, filed July 1, 1970, and now abandoned.

BACKGROUND OF THE INVENTION

This invention relates to the art of flame cutting, and it has more particular reference to a method of flame cutting mud relief concavities in the sides of sprockets or other toothed wheels, at zones between the teeth thereof.

As is well known, sprockets and like-toothed wheels which are intended for operation in mud must be provided with notches or grooves in their sides that communicate with the spaces between teeth, to permit mud to be expelled from said spaces as the sprocket rotates. In the past, mud relief grooves were cut or otherwise formed in the root portions of the sprocket teeth, so as to extend more or less circumferentially across their axial ends; notches, on the other hand, were milled or otherwise formed in the throat areas or zones between adjacent sprocket teeth, inwardly of their root circle.

Without such grooves or notches, certain types of muds tend to build up in the spaces between the teeth of sprockets, and such accumulations can cause damage to a chain trained over the sprocket, or even bend the shafts on which the sprockets are mounted.

The formation of mud relief grooves in the sides of a sprocket by milling or other machining operations, of course, can add considerably to the cost of producing the sprocket. For purposes of economy, the designers of sprockets and other toothed wheels strive to hold machining operations to a minimum. For that reason, many types of sprockets and other toothed wheels are now commonly produced by a low cost flame cutting method which, for example, can be practiced on the machine disclosed in Pat. No. 3,306,597, granted to Glenway Maxon, Jr. and William H. B. Wright III on Feb. 28, 1967.

This invention takes advantage of the savings in time and money which result from flame cutting of sprockets and other toothed wheels that must be operated in muddy environments, through the provision of a method by which mud relief concavities can also be flame cut in such wheels at little extra cost.

In this respect, it is a purpose of this invention to provide a method of flame cutting mud relief concavities in the sides of sprockets and other toothed wheels, which method can be practiced efficiently and with precision on the flame cutting machine of the aforesaid Maxon et al. Pat. No. 3,306,597.

SUMMARY

In its preferred form, the method of this invention produces flame cut mud relief concavities in the sides of sprockets or other toothed wheels, while they are rotated on their axes, in consequence of preheating of zones between adjacent teeth and at which the concavities are to be cut, and radial reciprocatory movement of a cutting flame toward and from an inner limit at which the flame impinges and traverses said zones, inwardly of the root circle of the teeth, while the cutting flame is oriented to sharply diverge away from the axis of the sprocket or wheel being acted upon. The cutting flame is reciprocated in a path that intersects the flame of a heating torch by which said preheating is effected. The rates of wheel and flame movement are controlled so that relative motion therebetween is slow enough for flame cutting whenever the flame enters said preheated zones, and fast enough to prevent cutting whenever the flame is outside of said zones.

In another embodiment of the method of this invention, the cutting flame is provided with preheating characteristics of its own to render the preheating torch unnecessary.

With these observations and objectives in mind, the manner in which the invention achieves its purpose will be appreciated from the following description and the accompanying drawings, which exemplify the invention, it being understood that such changes in the precise method of practicing the invention and in the specific apparatus disclosed herein may be made as come within the scope of the appended claims.

The accompanying drawings illustrate one complete example of the method of the invention, together with certain slight variations thereof, and in which:

FIG. 1 is a side elevational view of a flame cutting machine on which the method of this invention can be practiced;

FIG. 2 is a plan view of the speed control cam on the machine;

FIGS. 3 and 4 are perspective views illustrating the orientation of the heating and cutting flames during flame cutting of mud relief concavities in a sprocket;

DESCRIPTION OF THE PREFERRED EMBODIMENTS

Figure 5:
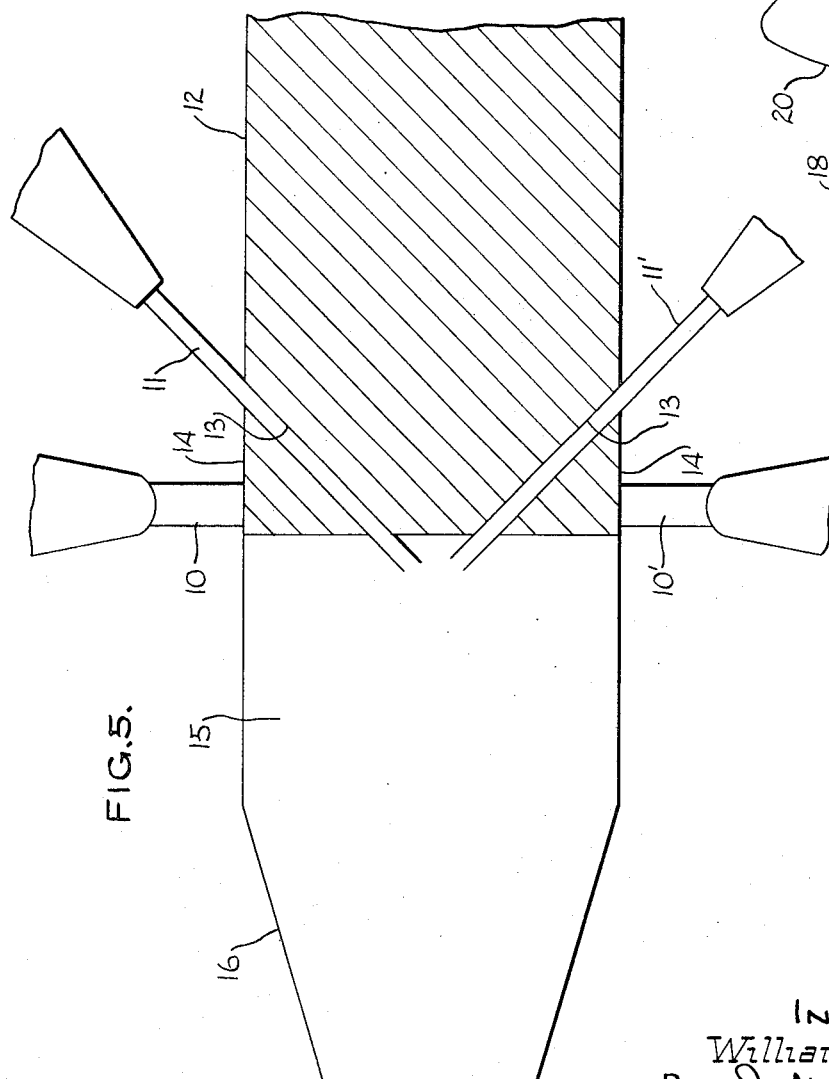
FIG. 5 is an enlarged sectional view diagrammatically illustrating that mud relief concavities can be simultaneously flame cut in both sides of a sprocket according to the method of this invention.

Referring now to the accompanying drawings, FIGS. 3 and 4 best illustrate how heating and cutting flames 10 and 11, respectively, are oriented with respect to a toothed wheel 12. The wheel is here shown as a sprocket in which mud relief concavities 13 are to be cut at zones 14 between the sprocket teeth 15, which zones lie mainly inwardly of the root circle of the teeth. As shown in FIG. 5, the teeth 15 can be chamfered, as at 16; and concavities 13 can be simultaneously flame cut in both sides of the sprocket in a manner to be described hereinafter. For convenience and ease of understanding, the concavities will here be referred to as being cut in the top side of a sprocket 12 which is rotating on a vertical axis in the direction of the arrow in FIG. 3.

The sprocket is rotated in this fashion, relative to the heating flame 10, while said flame is directed onto the top side of the sprocket to impinge an area thereof adjacent to and including the root circle of the teeth 15. The purpose of this is to effect preheating of the zones 14 circumferentially adjacent to but inwardly of the roots of the teeth, at which the mud relief concavities are to be flame cut. The flame 10 issues from a torch that can have a standard heating tip or nozzle burning a mixture of oxygen and a gas such as propane and issuing from several small diameter orifices in the nozzle. Preferably, the flame 10 is tilted out of vertical, so that the flame extends in a direction opposite to that in which the sprocket is rotating. The purpose of this will be discussed hereinafter.

The cutting flame 11 is also directed toward the top side of the sprocket, at the toothed edge thereof, but it is oriented to diverge angularly outwardly away from the sprocket axis at an angle of about 45°. It is recurrently moved radially inwardly and outwardly in a path which intersects the heating flame 10 at the point where the latter impinges the sprocket, to and from an inner limit at which the cutting flame will act upon the preheated zones 14.

It is important to so synchronize rotary motion of the sprocket with reciprocatory motion of the cutting flame that on its inward strokes, the cutting flame will be brought into impinging relationship with preheated zones 14, in succession, at points 17 on the root portions of the adjacent teeth 15 which are adjacent to their respective trailing faces 18 and simultaneously impinged by the heating flame 10. The points 17, which for convenience can be referred to as the flame entering points, or those at which the two flames 10 and 11 are coincident with one another on the inward strokes of the cutting flame, are located the same slight distance outwardly of the root circle of the teeth.

Similarly, the heating and cutting flames will also be coincident with one another on each outward stroke of the cutting flame; and the aforesaid synchronization of sprocket and cutting flame movements is such that the cutting flame begins to move out of each preheated zone 14, after cutting of a mud relief concavity 13 thereat, at the time the two flames are again coincident with one another. The flames will be coincident on the outstrokes of the cutting flame at points 19 on the leading faces 20 of the teeth, at the root portions thereof, which points are directly opposite the points 17 across the spaces between teeth.

It is important to the successful practice of the method of this invention that the rates at which the sprocket and the cutting flame are moved is substantially abruptly slowed down each time the cutting flame comes into coincidence with the heating flame at the points 17 on the inward strokes of the cutting flame. This slow-down is necessary to assure that the temperature of the preheated metal at the locations 17 will be raised to the combustion point under the combined effects of the two flames 10 and 11, before the motions are again speeded up. In this respect, it should be noted that the cutting flame 11 is preferably one having what can be referred to as low "preheat" of its own, and a high percentage of oxygen in its core.

For that purpose, the cutting torch can be equipped with what is known as a high speed tip having a central orifice from which oxygen alone issues, and a number of peripherally arranged orifices surrounding the central orifice, from which a mixture of oxygen and a gas such as propane issue. By itself, therefore, the cutting flame can be said to be an inefficient cutting instrument for starting a cut, but an excellent one when the metal is combustible with oxygen. Accordingly, once the metal of the sprocket is ignited at the points 17, the motions of the sprocket and the cutting flame can be speeded up to achieve flame cutting at a reasonable rate, since the heat of combustion together with the molten metal in the kerf cut by the flame will be sufficient to sustain the cutting action. In all cases, however, these motions are slow enough for good flame cutting, and slower than the motions permissible during the times the flame is outside the flame entering and leaving points.

As soon as cutting commences at each of the entering points 17, the combined motions of the sprocket and the cutting flame 11 will cause the latter to traverse the preheated zones 14 between, but inwardly of, the roots of adjacent teeth; and the kerf cut in the sprocket will have a concave curvature, being shallowest adjacent to the opposing flanks of adjacent teeth and deepest at a point on the root circle of the teeth midway between adjacent teeth.

After the cutting flame passes outwardly from coincidence with the heating flame, its motion and that of the sprocket can be again speeded up, as no further flame cutting is to take place until the cutting flame is again moved inwardly into coincidence with the heating flame. Consequently, if the heating and cutting flames are properly adjusted, and the rates of sprocket and cutting flame movement are properly controlled, it is possible for the cutting flame to be moved directly across portions of the sprocket teeth at locations outwardly of the points 17 and 19 without cutting into or otherwise damaging the teeth. This makes it imperative to effect traversal of the axial ends of the teeth by the cutting flame at a substantially fast rate, and at a location far enough removed from the influence of the heating flame as to assure against cutting by the flame 11.

For completely satisfactory results, however, the cutting flame is moved in such synchronization with rotary motion of the sprocket as to substantially follow the outline of the sprocket teeth outwardly beyond the points 17 and 19.

In either event, the method described can be ideally carried out on a flame cutting machine such as disclosed in the Maxon et al. Pat. No. 3,306,597 mentioned earlier. Because reference may be had to said patent for a complete understanding of the machine here shown somewhat diagrammatically in FIG. 1, only a short description of its main components follows.

The flame 10 is provided by a heating torch 25 which has a standard heating tip, and which is fixed with respect to the main frame 26 of the machine. The torch 25 is carried by a horizontal arm 27 for up and down adjusting motion, depending upon which way a knob 28 is rotated. The arm, in turn, is mounted in a bearing 29 for horizontal motion lengthwise of the arm. A knob 30 controls such adjusting motion of the arm. The bearing 29 is stationarily mounted on the top of the main frame 26, and the arm 27 extends forwardly out over and beyond the front of the frame so that the nozzle of the heating torch 25 can be located a distance below the top of the frame, forwardly thereof, directly over the peripheral portion of the sprocket 12.

The sprocket is seated on a pilot-like turntable 33 on on the top of a drive spindle 34 having a worm wheel 35 on its bottom, and the spindle extends upwardly through the hollow interior of a pedestal or support 36.

The flame 11 is provided by a cutting torch 38 which has a high speed tip such as described above, and which is mounted on the forward end of a carriage 39 to be movable therewith. The carriage is guided for reciprocatory fore and aft movement to carry the torch 38 radially inwardly and outwardly of the toothed edge of the sprocket, along a path such that its flame intersects the flame of the heating torch.

Reciprocatory motion is imparted to the carriage 39 to move the cutting torch inwardly and outwardly of the toothed edge of the sprocket, by means of a cam 42 mounted on a vertical shaft 43, which shaft is driven from a motor M through a variable speed transmission T. The cam 42 is connected with the carriage 39 by means of a cam follower 44 on the carriage engaging a track on the cam. The output shaft 45 of the transmission is drivingly connected with both the cam shaft 43 and with a horizontal shaft 46 that extends forwardly from the main frame 26. A worm 47 on the shaft 46 meshes with the worm wheel 35 on the bottom of the sprocket drive spindle to drive the latter.

The extent of reciprocatory motion of the carriage, and accordingly the stroke of the cutting torch, is determined by the throw of the cam 42. This cam also determines the course of travel of the cutting flame along the toothed edge of the sprocket as a consequence of the combined motions of the sprocket and the cutting torch. In other words, the cam 42 synchronizes sprocket and cutting torch movements in such a way as to assure the described traversal of the preheated zones 14 of the sprocket by the cutting flame, from points 17 to points 19 between adjacent pairs of sprocket teeth. From this, it will be seen that the cam 42 can either cause the flame of the cutting torch to generally follow the outline of the sprocket teeth at times when the cutting flame is outside of the preheated zones 14; or it can cause the cutting flame to travel more or less circumferentially across or beyond outer portions of the teeth, at their axial ends as described hereinbefore, after each concavity 13 is flame cut in the sprocket.

A second cam 50 mounted on the cam shaft 43 can be termed a speed control cam, since its shape determines when the rates of sprocket and cutting torch motion are to be increased and decreased. A cam follower 51 mounted on one end of an arm 52 tracks on the cam 50. The other end of the arm 52 can be fixed to the speed adjusting shaft 53 of the variable speed transmission T, to cause the same to speed up and slow down in accordance with the shape of the cam 50.

By way of example, the cam 50 can have a substantially semi-circular peripheral portion 55 which is concentric to the cam shaft axis; a pair of humps 56 and 57 at each circumferential end of the uniform diameter peripheral portion 55; and an only slightly convex peripheral portion 58 connecting the humps 56–57 and lying diametrically opposite the concentric peripheral portion 55.

With the cam follower 51 in its position seen in FIG. 2, engaged with the hump 56 at the point of maximum throw of the cam, and with the cam rotating in the direction of the arrow, the motions of the sprocket and the carriage for the cutting torch 38 will be the slowest. FIG. 2 thus represents the angular position of the speed control cam 50 on shaft 43 each time the flame of the inwardly moving cutting torch reaches coincidence with the flame of the heating torch, at points 17 on the sprocket. While the follower 51 is engaged with the concentric peripheral portion 55 of the cam, it causes substantially fast relative movement between the sprocket and the torch carriage 39.

When the follower rides down the trailing side of hump 56 and begins to track on the slightly convex portion 58 of the cam, the speeds are caused to first increase, and to then decrease as the follower approaches the second hump 57. Since the hump 57 does not extend out as far radially as the first hump 56, the speeds of the sprocket and cutting torch are not slowed down as much as when the follower rides over the hump 56.

The follower 51 rides on the peripheral portion 55 of the cam for slightly over one-half a revolution thereof, during the times the cutting flame is outside of the points 17 and 19, which can be called the flame entering and flame leaving points, respectively. At those times, of course, no flame cutting should be taking place, and relative motion between the cutting flame and sprocket can be substantially faster than when the cutting flame is entering the sprocket at the points 17.

FIG. 5 diagrammatically indicates that the method of this invention contemplates simultaneous flame cutting of mud relief concavities 13 in both sides of the sprocket, while the latter is rotated on its axis by spindle 34. As therein seen, duplicate heating and cutting flames 10' and 11', respectively, are caused to act upon the underside of the sprocket in the same way as their counterparts 10 and 11 do at the top of the sprocket. It is to be understood, of course, that the duplicate heating flame 10' is again produced by a stationary heating torch; while the duplicate cutting flame 11' is produced by a cutting torch moved radially inwardly and outwardly by its connection with the carriage 39, in unison with the torch that produces the flame 11. In practice, however, the sprocket is preferably rotated on a horizontal axis for such simultaneous flame cutting of the mud relief concavities therein.

Figure 6:
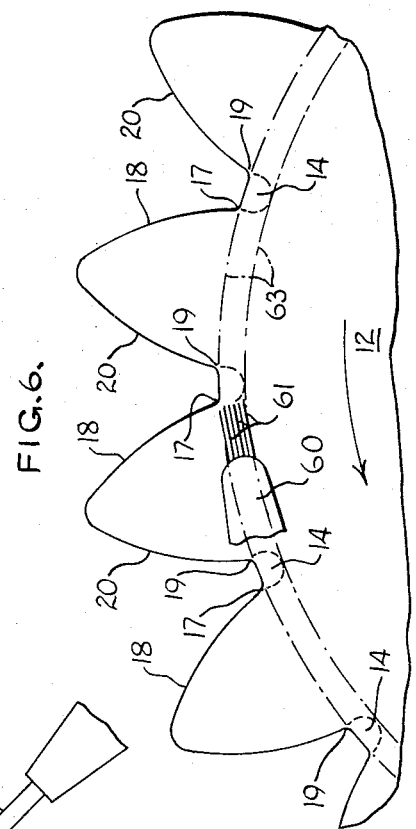
FIG. 6 illustrates how preheating can be effected by flames that impinge a substantially wide circumferential band at the root circle of the sprocket teeth.

FIG. 6 diagrammatically illustrates how the nozzle 60 of a special heating torch may be provided to direct a plurality of preheating flames onto the sprocket or other toothed wheel. Three preheating flames 61 can be seen issuing in a row from the nozzle 60, to effect preheating of a relatively wide circumferential band of the sprocket generally located between the concentric broken lines 63. This band, of course, extends outwardly as far as the points 17 and 19 mentioned earlier, and inwardly substantially to the radially innermost portions of the mud relief concavities 13 to be cut in the sprocket, so as to assure adequate preheating of said zones in a way that avoids heat concentration in one localized area.

The flame cutting of mud relief concavities in sprockets and the like can also be practiced by a variation of the method described above, which is characterized by the use of a cutting torch 38 having a flame 11 which has good "preheat" characteristics. In that case, the flame 10 of the heating torch 25 is not needed.

For that purpose, the cutting torch 38 can be provided with a so-called standard acetylene cutting nozzle, such as a No. 3 type 164 "Airco" tip, for example. A tip of that nature has a central orifice which is surrounded by a number of smaller orifices. Cutting oxygen issues from the central orifice, while a mixture of oxygen and acetylene or other gas having high heating characteristics issues from the surrounding smaller orifices. The acetylene and oxygen for these smaller orifices, for example, can enter the cutting torch at pressures of about 17½ and 36 p.s.i., respectively.

Except for the elimination of the heating torch 25 and and its flame 11, the method of flame cutting the mud relief concavities is otherwise the same as described. The toothed wheel is rotated on its axis while the cutting torch is moved in and out in timed relation to wheel rotation, to effect cutting of the concavities at the zones 14 between adjacent teeth on the wheel. As before, the motions of the torch and wheel are slowed down each time the combined heating and cutting flame of the torch reaches the entering points 17, and those motions are speeded up as said flame completes the cutting of each concavity and thereafter follows around the profiles of the teeth. While the combined heating and cutting flame is in the cutting zones 14, of course, the motions of the wheel and the cutting torch must be slow enough as to assure proper flame cutting.

From the foregoing description, together with the accompanying drawings, it will be apparent to those skilled in the art that the hereindescribed method of flame cutting mud relief concavities in sprockets or other toothed wheels can be practiced with efficiency and precision, and at a desirably low cost.

The invention is defined by the following claims:

1. The method of cutting mud relief concavities in one side of a toothed wheel such as a gear or sprocket, at zones that lie between the teeth and adjacent to the root circle thereof, which method is characterized by:
   (A) while rotating the wheel directing a cutting flame toward its toothed edge at said side thereof, with the flame oriented to diverge angularly outwardly away from the wheel axis;
   (B) moving the cutting flame radially inwardly and outwardly, toward and from an inner limit at which the cutting flame can act upon said zones of the wheel between the teeth thereof; and (C) so synchronizing the movements of the wheel and the cutting flame that the latter traverses said zones between adjacent teeth each time the cutting flame approaches its inner limit of motion.

2. The method of claim 1, wherein the speeds at which the cutting flame and the wheel are moved are so synchronized as to assure traversal of said zones by the cutting flame at a rate slow enough for flame cutting during the times the cutting flame is in said zones.

3. The method of claim 2, wherein said cutting flame has preheating characteristics and comprises an oxygen core and an envelope comprising a mixture of oxygen and a gas on the order of acetylene.

4. The method of claim 3, wherein mud relief concavities are simultaneously flame cut in the opposite sides of the wheel by duplicate cutting flames having said preheating characteristics and acting upon directly opposite areas of the wheel at opposite sides thereof;

and wherein said cutting flames are moved in unison radially inwardly and outwardly along the toothed edge of the wheel.

5. The method of flame cutting mud relief concavities in one side of a toothed wheel such as a gear or sprocket, at zones that lie between the teeth and adjacent to the root circle thereof, which method is characterized by:
(A) while rotating the wheel on its axis, directing a heating flame onto an area of said side thereof which includes the root circle, so as to effect successive preheating of adjacent ones of said zones in consequence of wheel rotation;
(B) directing a cutting flame toward the toothed edge of the rotating wheel at said side thereof with the flame oriented to diverge angularly outwardly away from the wheel axis;
(C) moving the cutting flame radially inwardly and outwardly in a path which intersects the heating flame, to and from an inner limit at which the cutting flame can impinge said preheated zones of the wheel;
(D) so synchronizing the movements of the wheel and the cutting flame that the latter traverses said zones between adjacent teeth each time the cutting flame approaches its inner limit of movement; and
(E) so synchronizing the speeds at which the wheel and cutting flame are moved that the latter traverses said preheated zones at a rate slow enough for flame cutting during the times the cutting flame is in said zones.

6. The method of flame cutting mud relief concavities in one side of a toothed wheel such as a gear or sprocket, at zones that lie between the teeth and adjacent to the root circle thereof, which method is characterized by:
(A) while rotating the wheel on its axis, directing a heating flame onto an area of said side thereof which includes the root circle, so as to effect successive preheating of adjacent ones of said zones in consequence of wheel rotation;
(B) directing a cutting flame toward the toothed edge of the rotating wheel at said side thereof with the flame oriented to diverge angularly outwardly away from the wheel axis;
(C) moving the cutting flame radially inwardly and outwardly in a path which intersects the heating flame, to and from an inner limit at which the cutting flame can impinge said preheated zones of the wheel;
(D) so synchronizing the movements of the wheel and the cutting flame that the latter traverses said zones between adjacent teeth each time the cutting flame approaches its inner limit of movement; and
(E) so synchronizing the speeds at which the wheel and cutting flame are moved that the latter traverses said preheated zones at a rate slow enough for flame cutting during the times the cutting flame is in said zones, and so as to effect relative movement between the wheel and cutting flame at a substantially faster rate during the times the cutting flame is outside said zones.

7. The method of claim 5, wherein the rates at which the wheel and the cutting flame are moved are reduced each time inward movement of the cutting flame brings it into coincidence with the heating flame.

8. The method of claim 5, wherein mud relief concavities are simultaneously flame cut in the opposite sides of the wheel by duplicate heating and cutting flames acting upon corresponding areas thereof, and wherein the duplicate cutting flame is moved radially in and out in synchronism with inward and outward movement of the first designated cutting flame.

9. The method of claim 8, wherein the duplicate heating and cutting flames are directed onto directly opposite areas of the wheel at opposite sides thereof;
and wherein the cutting flames are moved in unison radially inwardly and outwardly along the toothed edge of the wheel.

References Cited

UNITED STATES PATENTS

| | | | |
|---|---|---|---|
| 2,190,360 | 2/1940 | Howard | 148—9 |
| 2,816,843 | 12/1957 | Maxon, Jr. | 148—9 |

WAYLAND W. STALLARD, Primary Examiner